United States Patent [19]

Buchet et al.

[11] 4,054,460

[45] Oct. 18, 1977

[54] COMPOSITION AND METHOD FOR RETARDING THE SETTING OF CEMENTS

[75] Inventors: Jean H. Buchet, Nice, France; Fernand Peerts, Heverlee (Louvain), Belgium

[73] Assignees: Chemical Development Corporation, Nice, France; Tessenderlo Chemie S.A., Tessenderlo-B, Belgium

[21] Appl. No.: 724,451

[22] Filed: Sept. 17, 1976

[30] Foreign Application Priority Data

Sept. 18, 1975 France .................................. 75.28546

[51] Int. Cl.² .............................................. C04B 7/35
[52] U.S. Cl. ....................................... 106/89; 106/97; 106/117; 106/315
[58] Field of Search ................... 106/97, 117, 315, 89

[56] References Cited

U.S. PATENT DOCUMENTS 3,782,991   1/1974   Burge ................................. 106/315

*Primary Examiner*—J. Poer
*Attorney, Agent, or Firm*—Millen & White

[57] ABSTRACT

A retarding agent for cement consists essentially of in percent by weight:

| | |
|---|---|
| $CaF_2$ | 50 – 65 |
| $Ca_3(PO_4)_2$ | 7 – 12 |
| $CaSO_4$ | 5 – 7.5 |
| $SiO_2$ | 10 – 20 |
| $Fe_2O_3$ | 1 – 2 |
| $Al_2O_3$ | 1 – 5, | this retarding agent is preferably the insoluble residue by-product obtained by dissolving raw phosphate with an inorganic acid. It retards the setting of cement at high ambient temperatures, and can be used as well with sea water or with fresh water in the making of concrete and the like.

10 Claims, No Drawings

COMPOSITION AND METHOD FOR RETARDING THE SETTING OF CEMENTS

BACKGROUND OF THE INVENTION

This invention relates to cement compositions and a method for retarding the setting of cements, as well as to compositions and final products containing cements and a novel retarding agent.

It is known that in some cases it is necessary to add retarding agents to cement to decrease the rate of hydration and to increase the time before the commencement and/or the termination of the setting period. These retarding agents are used for multiple purposes, in particular to offset the accelerating effect of high ambient temperatures, thereby facilitating work, for example, in tropical countries or in the summertime in temperate countries, or under subterranean conditions. Where the ambient temperature is not a problem, the retarders can be used to increase the normal time for softness and workability of cement mixtures and to allow, for example, long distance transport, continuous injection, pumping, etc.

SUMMARY OF THE INVENTION

An object of this invention is to provide a composition which will retard the setting speed of (a) Portland cements which may optionally contain secondary constituents such as slags, ashes, pozzolana or mixtures of these products, or (b) slag cements as for example slag cements with clinker.

Other objects comprise methods of using such retarding agents and the final products, e.g. concrete, containing such agents.

Upon further study of the specification and appended claims, further objects and advantages of this invention will become apparent to those skilled in the art.

To attain these objects, into the cement is incorporated a composition consisting essentially of a mixture of calcium fluoride, tricalcium phosphate, calcium sulfate, silicon dioxide, iron and aluminum oxides and which is preferably the insoluble residue obtained by dissolving raw phosphate with an inorganic acid such as hydrochloric, nitric and/or phosphoric acid. After washing, drying and grinding, this residue has the appearance of a chocolate-brown free-flowing powder which, in addition to the main constituents mentioned hereabove, can also contain small quantities of other compounds resulting from the impurities of the treated raw phosphate, such as for example magnesium, alkali metal, and rare earth compounds. The proportions of the different constituents are preferably within the following limits (in % by weight):

| | |
|---|---|
| $CaF_2$ | 50 – 65 |
| $Ca_3(PO_4)_2$ | 7 – 12 |
| $CaSO_4$ | 5 – 7.5 |
| $SiO_2$ | 10 – 20 |
| $Mg_3(PO_4)_2$ | 0 – 2 |
| $CaCl_2$ | 0 – 0.5 |
| $Fe_2O_3$ | 1 – 2 |
| $Al_2O_3$ | 3 – 5 |
| $Na_2O$ | 0 – 1 |
| $K_2O$ | 0 – 1 |
| Rare earth | 0 – 0.2 |

The various compounds mentioned hereabove can also be present at least partially in complex forms: for example, a part of the calcium fluoride can be combined with the tricalcium phosphate in form of fluoapatite.

It is known that during the manufacture of Portland cement, clinker is ground with the addition of calcium sulfate (gypsum) for the control of set. An excess of gypsum being detrimental to the concrete, the amount permitted in cement is limited by specifications. The calcium sulfate content of the retarding composition used according to the invention being low, this composition can be added to the various kinds of Portland cement without substantially altering their $SO_3$ content which remains in conformity with the specifications.

In its most economic form, the retarding agent according to the invention is a by-product derived from the manufacture of dicalcium phosphate by the reaction of hydrochloric acid with raw phosphate and separation of the impurities precipitated when preneutralizing the attack liquor.

For a detailed description of the procedure to make this by-product, reference is directed to Chemistry and Technology of Fertilizers — Edited by Vincent Sauchelli — American Chemical Society Monograph Series No. 148, p. 334 – 336.

The proportions of the different constituents of this by-product vary generally within the following limits (in % by weight):

| | |
|---|---|
| $CaF_2$ | 55 – 60 |
| $Ca_3(PO_4)_2$ | 8 – 10 |
| $CaSO_4$ | 6 – 7 |
| $SiO_2$ | 15 – 20 |
| $Mg_3(PO_4)_2$ | 1 – 1.2 |
| $CaCl_2$ | 0.3 – 0.5 |
| $Fe_2O_3$ | 1.5 – 2 |
| $Al_2O_3$ | 3.5 – 4.5 |
| $Na_2O$ | 0.3 – 0.7 |
| $K_2O$ | 0.3 – 0.7 |
| Rare earth | 0 – 0.2 |

The retarding agent according to the invention has a Blaine specific area between 2300 and 2900 $cm^2/g$. It has been observed that the addition of at least 0.5% by weight relative to the cement of the retarding agent is effective to exhibit a retarding effect on the setting cement, this effect being more or less pronounced according to the type of cement used as shown by examples given hereafter. In general for the fabrication of mortars and concretes the quantity (dry basis) of retarding agent to be added is between about 0.5 and 5% and preferably between 1 and 3% by weight relative to the cement contained in the final mixture, i.e., for a 5% content of retarding agent there would be 5 parts of retarding agent and 100 parts of cement.

It has also been found, quite unexpectedly, that the retarding effect of the agent of the invention remains even when a highly saline water such as sea water or brines are used for mixing the mortar. By using the quantities of composition given hereabove, with sea water for example, a retarding effect is obtained which is at least equal and sometimes better than the effect obtained under the same conditions with fresh water. The retarding effect also remains when the step of mixing in the making of the concrete or mortar is conducted with a saline water at high temperature, which presents a special advantage in hot countries.

The retarding agent composition is generally added to the water for mixing mortars and concretes but it can also be admixed to the cement. In the latter case, the admixing to the cement can be conducted either during the manufacture of the cement, for example during the grinding step conducted after calcining, or directly before use. Mixtures of the cement and varying amounts or retarding agent can also be prepared for addition to the cement before use, the quantity of retarding agent in the master batch mixture being for example from 1 to 50% by weight which permits an easier proportioning of the constituents and decreases the risks of local overdoses of retarding agent when making the concrete or mortar.

Portland cement is a powdered material made by sintering a mixture of raw materials, one of which is composed mainly of calcium carbonate (as limestone) and the other of aluminum silicates (as clay or shale). During the sintering process, chemical reactions take place producing nodules, called clinkers, which are composed principally of calcium silicates and aluminates. When the clinker is pulverized with a small amount of calcium sulfate (for example gypsum) the resulting powder is the Portland cement of commerce. In most countries Portland cement must meet particular standard specifications laid down by established authorities and which can be slightly different from one country to the other.

Slag cements are the cements obtained by intergrinding Portland cement clinker with granulated blast-furnace slag to produce a Portland blast-furnace slag cement. For this use the slag must be chilled very rapidly to cool the slag so that crystallization is prevented and the product is a supercooled liquid or glass. The lightweight froth or sandlike product that results is called granulated slag. The amount of slag permitted to be interground with the Portland cement clinker varies from one country to the other.

When a limited amount of water is mixed with cement, a paste is formed which sets in a few hours to give a solid structure. When sand and gravel or crushed stone are intermixed with the cement paste, the plastic mixture often called mortar sets to form a dense structure which is concrete. When sand alone is admixed with the amount paste, the grout is a mortar which can be troweled and becomes hard in place, to bond units of masonry structure.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

The tests were carried out with mortar ⅓ AFNOR (French standard P 15401), having in all cases the same softness and prepared from three types of cement: artificial Portland cements designated by French standard P 15302 as CPA 325 HTS containing 4.5% of $C_3A$ and CPA 400 containing 13% of $C_3A$, and slag cement with clincker designated by French standard P 15305 as CLK 325 by using as mixing water either fresh water, or sea water containing 38g/l of salts. The number given in each designation (for example 400 or 325) corresponds to the requirement for minimum compressive strength at 28 days.

To the mixing water was added 1.5% by weight, based on the cement, of the following retarding agent composition which is a by-product derived from the manufacture of dicalcium phosphate by means of hydrochloric acid:

| | |
|---|---|
| $CaF_2$ | 58.5% |
| $Ca_3(PO_4)_2$ | 9.7% |
| $CaSO_4$ | 6.7% |
| $SiO_2$ | 16.5% |
| $Mg_3(PO_4)_2$ | 1.6% |
| $CaCl_2$ | 0.3% |
| $Fe_2O_3$ | 1.7% |
| $Al_2O_3$ | 3.9% |
| $Na_2O$ | 0.5% |
| $K_2O$ | 0.5% |
| Rare earth | 0.15% |

This composition was in the form of a free-flowing powder having a specific gravity (actual density) of 2.45, and apparent density (product without any packing, i.e., bulk density) of 0.55 and the following particle size distribution:

| | |
|---|---|
| >200 microns | 17.45% |
| 250–177 microns | 8.05% |
| 177–125 microns | 18.80% |
| 120–100 microns | 4.50% |
| 100– 63 microns | 21.25% |
| 63– 32 microns | 17.20% |
| < 32 microns | 12.20% |

Table I infra shows the results (average of 3 experiments) obtained at a temperature of 20° C by using fresh water as mixing water, with and without the addition of the retarding agent composition (RC).

TABLE I

| Cement | Quantity of RC% by weight | W/C | Beginning of the set in h and mn | End of the set in h and mn |
|---|---|---|---|---|
| CPA 325 | 0 | 0.50 | 3h 20 | 5h 30 |
| HTS | 1.5 | 0.522 | 4h 25 | 7h 10 |
| CPA 400 | 0 | 0.50 | 2h 55 | 4h 50 |
| | 1.5 | 0.538 | 3h 50 | 6h 20 |
| CLK 325 | 0 | 0.50 | 3h 30 | 6h |
| | 1.5 | 0.535 | 5h 30 | 8h 20 |

W/C is the ratio water/cement by weight. It can be seen that to obtain an equal softness of the mortar, the quantity of water to be added is slightly higher when a retarding agent is present.

The duration of the setting is measured by using the standardized method with Vicat needle (French standard P 15431).

It can be observed from the results of Table I that the setting time is increased by from about 30 to 60% for the beginning of the setting and by from about 30 to 40% for the end of the setting by the addition of 1.5% of the composition of the invention.

Table II infra sets forth the mechanical strength of the products obtained: flexion (tensile) strength (F) and compression strength (C) expressed in bars and measured according to the standardized methods (French standard P 15451) after 2 days and 7 days. The effect of the retarding agent, which normally appears after 2 days as a decrease in the mechanical strength, disappears after 7 days for the cement CPA 325 and tends to decrease for the two other cements.

TABLE II

| Cement | Quantity of RC% by weight | 2 days F | 2 days C | 7 days F | 7 days C |
|---|---|---|---|---|---|
| CPA 325 | 0 | 50 | 263 | 72 | 440 |
| HTS | 1.5 | 49.2 | 258 | 80.4 | 445 |

TABLE II-continued

| Cement | Quantity of RC% by weight | 2 days F | 2 days C | 7 days F | 7 days C |
|---|---|---|---|---|---|
| CPA 400 | 0 | 58 | 282 | 75.3 | 482 |
|  | 1.5 | 55.2 | 261 | 71.7 | 465 |
| CLK 325 | 0 | 40.3 | 154 | 72 | 360 |
|  | 1.5 | 32.9 | 128 | 68.5 | 342 |

Tables III and IV show the results obtained under the same conditions as above but by using sea water as the mixing water.

TABLE III

| Cement | Quantity of RC% by weight | W/C | Beginning of the setting in h and mn | End of the setting in h and mn |
|---|---|---|---|---|
| CPA 325 | 0 | 0.50 | 1h 55 | 4h 20 |
| HTS | 1.5 | 0.527 | 3h 40 | 5h 40 |
| CPA 400 | 0 | 0.50 | 1h 50 | 3h 45 |
|  | 1.5 | 0.53 | 2h 50 | 5h 10 |
| CLK 325 | 0 | 0.50 | 2h 05 | 4h |
|  | 1.5 | 0.53 | 4h 10 | 6h |

TABLE IV

| Cement | Quantity of RC% by weight | 2 days F | 2 days C | 7 days F | 7 days C |
|---|---|---|---|---|---|
| CPA 325 | 0 | 56.2 | 374 | 78 | 560 |
| HTS | 1.5 | 57.3 | 366 | 58.9 | 563 |
| CPA 400 | 0 | 63.4 | 404 | 77.6 | 548 |
|  | 1.5 | 60.8 | 381 | 73 | 509 |
| CLK 325 | 0 | 59.5 | 299 | 92.2 | 530 |
|  | 1.5 | 53.8 | 281 | 83.4 | 545 |

From the results of Table III, it is observed that the setting time of the mortar is increased by from about 54 to 100% for the commencement of the setting and by from about 30 to 50% for the termination of the setting period. When comparing with the results obtained by mixing with fresh water (respectively 30 to 60% and 30 to 40%), it is observed that the retarding effect is on the whole more marked with the mixing is conducted with sea water.

EXAMPLE 2

A mortar ½ AFNOR was prepared from artificial Portland cement with slag and ashes usable in sea according to the French standards, this cement being designated as CPALC 325 by French standard P 15302.

The cement was mixed with sea water or with brine containing 16g/l of dissolved salts with the addition of 1.5% by weight of cement of retarding composition (RC) as described in Example 1. The tests were conducted at a room temperature of about 20° C, with a ratio water/cement of 0.50. The test results are given in Table V in comparison with a control test having no retarding agent.

TABLE V

| | Setting time in h and mn Beginning | Setting time in h and mn End | 2 days F | 2 days C | 7 days F | 7 days C |
|---|---|---|---|---|---|---|
| Sea water control | 4h 10 | 8h 20 | 46.0 | 235 | 55.5 | 325 |
| Sea water 1.5% RC | 6h | 12h | 50.0 | 215 | 54.5 | 320 |
| Brine 1.5% RC | 6h 20 | 13h 40 | 51.5 | 225 | 56 | 310 |

The increase in the setting time (beginning and end) is from 44% when mixing with sea water and respectively from 52 to 64% when mixing with the brine.

EXAMPLE 3

The tests were carried out at 21° and 33° C with a mortar ½ AFNOR (French standard P 15403) prepared from a slag cement with clinker containing 80% of slag called CLK 325 by using either fresh water or sea water (42g/l dissolved salts) as mixing water. The normalized designation CLK 325 is given by the French standard P 15305.

The retarding agent composition described in Example 1 was added to the mixing water in quantities of 0, 1 and 2% (RC%) by weight of dry cement.

The results obtained are shown in Table VI in which 1% is the increase in the setting time in % relative to the setting time of the control test. From this table it can be seen that for the beginning of the setting of the mortar, the retarding effect of the composition of the invention is more marked at higher temperature with sea water as well as with fresh water. For the end of the setting, the retarding effect is greater at higher temperature with sea water but lower with fresh water.

It can also be observed from this table that the retarding effect increases with the quantity of retarding agent composition, which permits a rational variation in the desired effect by an adjustment of the quantity of retardant agent composition to be added.

EXAMPLE 4

The tests were carried out at 20° and 33° C with concrete containing 350kg of cement per cubic meter, by using on the one hand a slag cement with clinker (CLK 325) with a ratio water/cement of 0.523 and on the other hand an artificial Portland cement (CPA 400 HTS) with a ratio water/cement of 0.465 in order to obtain the same softness in both cases. CPA 400 HTS designates according to the French standard P 15302 a Portland cement containing 4.5% of $C_3A$ and having a higher silicon content than CPA 400 which contains 13% of $C_3A$.

In the first case 2% of the composition described in Example 1 was added and in the second case 3% of the same composition. The setting time with sea water was measured in comparison to control tests conducted without any addition of retarding agent by using fresh water and sea water as mixing water. The setting time was measured by the Kelly-Bryant method which comprises measuring the wrenching force exerted on calibrated rods embedded in wet concrete: when this force exceeds 6kg, the concrete cannot be placed by vibration. The setting time is given by the time which is the limit for vibrating concrete (TV).

The results of these tests are shown in Table VII which gives the setting time with fresh water and sea water of the reference samples, the setting time with sea water with addition of retarding agent composition (RC) as well as the increase (1%) relative to the reference samples with fresh water (first number of the column) and with sea water (second number of the column).

It is seen that the quantity of retarding composition to be added depends not only on the desired effect but also on the type of cement used. In each case, routine tests are sufficient for the man skilled in the art to determine the quantity of retardant agent composition to be incorporated into the mixture in order to obtain the particular desired effect according to the type of the cement to be treated. Such tests are usually made on the site of works for all the chemical additives to be added to mortars. Samples of mortars are prepared under the same conditions with the type of cement to be used by adding 0.5D, 1D and 3D, D being the average dose of additive to be employed, and compared with a control sample having no retarding agent. For the retarding agent composition of the invention, D can be for example 1.5% by weight based on the cement.

weight based on cement of the retarding composition (RC) described in example 1. The concrete was prepared and kept at the temperature of 20° C.

On all the samples the concrete contraction after 7, 14, 28 and 90 days was measured in mm/m according to Belgian standard NBN 748-12: the results of these measures are gathered in Table IX.

TABLE VI

| Temperature °C | RC% | Fresh Water | | | | Sea Water | | | |
|---|---|---|---|---|---|---|---|---|---|
| | | Beginning of the setting | | End of the setting | | Beginning of the setting | | End of the setting | |
| | | Time in h and mn | 1% | Time in h and mn | 1% | Time in h and mn | 1% | Time in h and mn | 1% |
| 21 | 0 | 7h 15 | — | 10h | — | 6h 05 | — | 9h 40 | — |
| | 1 | 9h 25 | 29 | 13h 15 | 30 | 9h | 24 | 12h 15 | 26 |
| | 2 | 10h 30 | 44 | 13h 50 | 38 | 10h 40 | 37 | 12h 40 | 31 |
| 33 | 0 | 4h 05 | — | 6h 15 | — | 4h 40 | — | 6h 50 | — |
| | 1 | 5h 30 | 34 | 7h 45 | 19 | 7h | 50 | 9h 20 | 36 |
| | 2 | 6h 05 | 48 | 8h 20 | 29 | 8h 40 | 91 | 10h | 46 |

TABLE VII

| Temperature °C | CLK 325 | | | | CPA 400 HTS | | | |
|---|---|---|---|---|---|---|---|---|
| | Ref. 0% RC | | 2% RC | | Ref. 0% RC | | 3% RC | |
| | TV Fresh Water | TV Sea Water | TV Sea Water | 1% | IV Fresh Water | TV Sea Water | TV Sea Water | 1% |
| 20 | 6h 45 | 6h | 10h | 48–66 | 4h 30 | 2h 55 | 4h 55 | 9–68 |
| 33 | 5h | 4h 15 | 6h 15 | 25–47 | 3h 05 | 2h 20 | 3h 55 | 27–67 |

EXAMPLE 5

Concrete was prepared from 350kg of Portland cement designated by Belgium standard NBN 711-11 as P 300, 1280kg (800 l) of rolled gravel (5 to 30mm), 640kg (400 l) of river sand (0 to 5mm) and water, the ratio water/cement being 0.42. The mixing water used was either fresh water or a reconstituted sea water of the type Mediterranean having the following composition (g/l):

| NaCl | : | 27 |
|---|---|---|
| $MgSO_4$ | : | 2.4 |
| $MgCl_2$ | : | 2.8 |
| $CaCl_2$ | : | 1.7 |
| $K_2SO_4$ | : | 0.9 |
| KBr | : | 0.1 |

The experiments were effected at 20° and 30° C with the addition of 2 or 5% by weight based on cement of the retarding composition (RC) described in example 1 in comparison with a control test having no retarding agent. The setting retarding effect of the composition was observed in all cases, the measures being made according to Belgium standard NBN 15-204, and the compression strength (kg/cm²) of each concrete sample obtained after 7, 14 and 28 days was measured according to Belgian standard NBN 15-220. Table VIII shows the results of these measures.

EXAMPLE 6

Concrete was prepared under the same conditions as in example 5 with the addition of 0, 2, 3 or 5% by

TABLE VIII

| RC% | mixing water | Temperature °C | kg/cm² 7 days | kg/cm² 14 days | kg/cm² 28 days |
|---|---|---|---|---|---|
| 0 | fresh water | 20 | 376.6 | 443.5 | 570.9 |
| | | 30 | 387.6 | 449.9 | 505.9 |
| | sea water | 20 | 435.0 | 481.9 | 484.6 |
| | | 30 | 390.5 | 461.6 | 460.0 |
| 2 | fresh water | 20 | 389.5 | 516.3 | 587.8 |
| | | 30 | 377.4 | 485.1 | 549.7 |
| | sea water | 20 | 468.1 | 467.9 | 494.4 |
| | | 30 | 452.8 | 516.6 | 599.8 |
| 5 | fresh water | 20 | 407.3 | 483.7 | 590.1 |
| | | 30 | 494.3 | 530.6 | 633.9 |
| | sea water | 20 | 467.3 | 488.3 | 550.0 |
| | | 30 | 427.5 | 507.4 | 527.1 |

TABLE IX

| RC% | 0 | | 2 | | 3 | | 5 | |
|---|---|---|---|---|---|---|---|---|
| Time in days | fresh water | sea water | fresh water | sea water | fresh water | sea water | fresh water | sea water |
| 7 | 0.360 | 0.408 | 0.326 | 0.250 | 0.054 | 0.061 | 0.066 | 0.012 |
| 14 | 0.664 | 0.664 | 0.424 | 0.340 | 0.140 | 0.118 | 0.114 | 0.026 |
| 28 | 0.724 | 0.748 | 0.476 | 0.438 | 0.230 | 0.218 | 0.196 | 0.128 |
| 90 | 0.814 | 0.838 | 0.578 | 0.618 | 0.310 | 0.394 | 0.292 | 0.324 |

EXAMPLE 7

A mortar was prepared according to Belgian standard NBN-312 207 and 208 from a supersulfated cement designated as S 400 by Belgian standard NBN 12-107, and constituted by an homogeneous mixture of slag, calcium sulfate and Portland cement clinker and having a $SO_3$ content higher than 5%. The preparation was made by using as mixing water either fresh water or a reconstituted sea water having the following composition (g/l):

| NaCl | : | 30 |
|---|---|---|
| $MgSO_4 . 7H_2O$ | : | 5 |
| $MgCl_2 . 6H_2O$ | : | 6 |
| $CaSO_4 . 2H_2O$ | : | 1.5 |
| $K_2CO_3$ | : | 0.2 |

The tests were carried out at 35° C (preparation and keeping of the mortar) with the addition of 1, 3 or 5% by weight based on cement of the retarding composition (RC) described in example 1 in comparison with control test having no retarding agent. After 3, 7 and 28 days the flexion strength and the compression strength were measured. The results obtained are given in Table X. It can be seen from these results that the retarding effect of the composition appears in all cases and that, for this type of cement, the setting time increases when the added quantity of the composition increases when using fresh water but does not substantially vary when using sea water. In all the tests, the addition of the retarding compositions notably increases the compression strength after 28 days and does not substantially modify the flexion strength.

TABLE X

| Mixing Water | RC% | Setting time Beginning h and mn | End h and mn | Flexion strength kg/cm² 3d | 7d | 28d | Compression strength kg/cm² 3d | 7d | 28d |
|---|---|---|---|---|---|---|---|---|---|
| fresh water | 0 | 3h 51 | 4h 18 | 87.9 | 107.2 | 100.8 | 464.6 | 593.7 | 709.9 |
|  | 1 | 4h 13 | 4h 28 | 92.2 | 101.9 | 115.0 | 480.2 | 587.5 | 740.6 |
|  | 3 | 4h 17 | 4h 47 | 85.1 | 96.2 | 105.4 | 463.5 | 596.3 | 755.7 |
|  | 5 | 4h 30 | 5h 05 | 85.6 | 89.5 | 101.6 | 470.8 | 611.5 | 745.9 |
| sea water | 0 | 2h 55 | 3h 30 | 84.4 | 96.8 | 110.6 | 417.7 | 570.3 | 686.5 |
|  | 1 | 3h 39 | 4h 04 | 89.4 | 103.9 | 106.7 | 453.6 | 570.3 | 733.9 |
|  | 3 | 3h 31 | 4h 06 | 94.7 | 108.6 | 114.7 | 446.9 | 603.6 | 721.4 |
|  | 5 | 3h 55 | 4h 05 | 75.5 | 99.9 | 109.1 | 466.2 | 624.5 | 749.6 |

EXAMPLE 8

Cements A, B and C were prepared by intergrinding of Portland cement clinker, limestone and calcium sulfate (CaSO$_4$, 0.5H$_2$O) without or with the addition of the retarding agent composition (RC) described in example 1. The mixtures to be ground had the following composition in % by weight:

|  | A | B | C |
|---|---|---|---|
| clinker | 87 | 86 | 84 |
| limestone | 8 | 8 | 8 |
| calcium sulfate | 5 | 3 | 3 |
| RC | 0 | 3 | 5 |

Mortars having an equal softness were prepared at about 20° C from cements A, B and C by mixing with sea water.

Table XI sets forth the setting time and the mechanical strength of the products obtained.

TABLE XI

| Cement | Setting time in h and mn Beginning | End | Flexion kg/cm² 3d | 7d | 28d | Compression kg/cm² 3d | 7d | 28d |
|---|---|---|---|---|---|---|---|---|
| A | 2h 30 | 5h 10 | 42.2 | 59 | 73.3 | 244 | 361 | 491 |
| B | 5h 00 | 8h 00 | 49.2 | 65.5 | 74 | 309 | 426 | 538 |
| C | 4h 20 | 7h 00 | 47.8 | 64 | 76.5 | 291 | 430 | 540 |

EXAMPLE 9

A series of experiments was made to compare the action of the retarding composition of the invention with the action of some of its constituents.

The cements used were French artificial Portland cements CPA 325 HTS and CPA 400 defined in Example 1. The water used for preparing the mortar was the reconstituted sea water the composition of which is given in Example 7.

The tests to measure the setting time were carried out at about 20° C according to the Belgian standard NBN B12-207 with the addition of the following additives: retarding composition (RC) described in Example 1, calcium fluoride (CaF$_2$), raw phosphate (tricalcium phosphate) and calcium sulfate (gypsum). The test results are given in Table XII in comparison with a control test having no retarding agent.

From the results of Table XII it can be seen that when used alone the main constituents of the composition have practically no retarding effect compared with the substantial effect of the composition.

TABLE XII

| Additives | | CPA 325 HTS | | CPA 400 | |
|---|---|---|---|---|---|
| Nature | % based on cement | Beginning of the set in h and mn | End of the set in h and mn | Beginning of the set in h and mn | End of the set in h and mn |
| — | — | 3h 45 | 4h 36 | 3h 23 | 4h 08 |
| RC | 1.5 | 7h 43 | 8h 30 | 6h 29 | 7h 09 |
| CaF$_2$ | 0.9 | 4h 00 | 4h 30 | 3h 15 | 4h 10 |
| CaF$_2$ | 1.5 | 3h 47 | 4h 27 | 3h 30 | 4h 20 |
| Raw phosphate | 0.15 | 3h 45 | 5h 22 | 3h 25 | 4h 00 |
| Raw phosphate | 1.5 | 4h 00 | 4h 40 | 3h 27 | 4h 12 |
| Gypsum | 0.1 | 3h 49 | 4h 34 | 3h 13 | 3h 53 |
| Gypsum | 1.5 | 3h 45 | 4h 30 | 3h 20 | 4h 10 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition comprising:
   a. a cement selected from the group consisting of Portland cement, slag cement and mixtures thereof;
   b. a retarding agent in an amount relative to the cement contained in the final composition of 0.5-5% by weight, said retarding agent consisting essentially of, in percent by weight:

| CaF$_2$ | 50 – 65 |
|---|---|
| Ca$_3$(PO$_4$)$_2$ | 7 – 12 |
| CaSO$_4$ | 5 – 7.5 |
| SiO$_2$ | 10 – 20 |
| Fe$_2$O$_3$ | 1 – 2 |
| Al$_2$O$_3$ | 1 – 5, | said retarding agent being the insoluble residue by-product obtained by dissolving raw phosphate with hydrochloric, nitric or phosphoric acid.

2. A composition comprising:
   a. a cement selected from the group consisting of Portland cement, slag cement and mixtures thereof;

b. a retarding agent in an amount relative to the cement contained in the final composition of 0.5–5% by weight, said retarding agent consisting essentially of, in percent by weight:

| | |
|---|---|
| $CaF_2$ | 50 – 65 |
| $Ca_3(PO_4)_2$ | 7 – 12 |
| $CaSO_4$ | 5 – 7.5 |
| $SiO_2$ | 10 – 20 |
| $Fe_2O_3$ | 1 – 2 |
| $Al_2O_3$ | 3 – 5 |
| $Mg_3(PO_4)_2$ | 0 – 2 |
| $CaCl_2$ | 0 – 0.5 |
| $Na_2O$ | 0 – 1 |
| $K_2O$ | 0 – 1 |
| Rare earth | 0 – 0.2, | wherein the retarding agent is a brown free-flowing powder derived from the reaction of hydrochloric acid with raw phosphate and separation of the impurities precipitated when preneutralizing the attack liquor.

3. A composition according to claim 2, wherein said retarding agent consists essentially of, in percent by weight:

| | |
|---|---|
| $CaF_2$ | 55 – 60 |
| $Ca_3(PO_4)_2$ | 8 – 10 |
| $CaSO_4$ | 6 – 7 |
| $SiO_2$ | 15 – 20 |
| $Mg_3(PO_4)_2$ | 1 – 1.2 |
| $CaCl_2$ | 0.3 – 0.5 |
| $Fe_2O_3$ | 1.5 – 2 |
| $Al_2O_3$ | 3.5 – 4.5 |
| $Na_2O$ | 0.3 – 0.7 |
| $K_2O$ | 0.3 – 0.7 |
| Rare earth | 0 – 0.2. |

4. A composition according to claim 2, said retarding agent being present in amount of 1–3% by weight.

5. A composition according to claim 1, said cement being a Portland cement, and further comprising sufficient sand, gravel or crushed stone to constitute concrete upon setting.

6. A composition according to claim 1, said cement being a mixture of Portland cement and slag cement, and further comprising sufficient sand, gravel or crushed stone to constitute concrete upon setting.

7. In a method of making concrete comprising mixing Portland cement with mineral aggregate and water, the improvement wherein a retarding agent is mixed into the concrete, said retarding agent being added in set retarding amounts and consisting essentially of, in weight percent:

| | |
|---|---|
| $CaF_2$ | 50 – 65 |
| $Ca_3(PO_4)_2$ | 7 – 12 |
| $CaSO_4$ | 5 – 7.5 |
| $SiO_2$ | 10 – 20 |
| $Fe_2O_3$ | 1 – 2 |
| $Al_2O_3$ | 3 – 5 |
| $Mg_3(PO_4)_2$ | 0 – 2 |
| $CaCl_2$ | 0 – 0.5 |
| $Na_2O$ | 0 – 1 |
| $K_2O$ | 0 – 1 |
| Rare earth | 0 – 0.2 | said retarding agent being the insoluble residue by-product obtained by dissolving raw phosphate with hydrochloric, nitric or phosphoric acid.

8. A method according to claim 7, wherein said water is saline water.

9. A method according to claim 7, wherein the mixing is conducted at about 15°–45° C.

10. A method according to claim 7, wherein the retarding agent is a brown free-flowing powder derived from the production of hydrochloric acid with raw phosphate and separation of the impurities precipitated when preneutralizing the attack liquor.

* * * * *